United States Patent
Nakamura et al.

(10) Patent No.: US 7,102,903 B2
(45) Date of Patent: Sep. 5, 2006

(54) DRIVE APPARATUS, CONTROL METHOD FOR THE DRIVE APPARATUS, STORAGE MEDIUM STORING A PROGRAM CONTROLLING THE DRIVE APPARATUS, AND POWER OUTPUT APPARATUS

(75) Inventors: Makoto Nakamura, Anjo (JP); Eiji Sato, Toyoto (JP); Ryoji Oki, Toyota (JP); Masayuki Komatsu, Aichi-ken (JP); Sumikazu Shamoto, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 228 days.

(21) Appl. No.: 10/251,827

(22) Filed: Sep. 23, 2002

(65) Prior Publication Data

US 2003/0067278 A1 Apr. 10, 2003

(30) Foreign Application Priority Data

Oct. 4, 2001 (JP) ........................ 2001-308679

(51) Int. Cl.
*H02M 7/5387* (2006.01)
*H02M 7/68* (2006.01)

(52) U.S. Cl. ................... 363/98; 363/132; 318/139; 318/799

(58) Field of Classification Search ............... 363/98, 363/132, 37, 127, 97, 39, 40, 41, 131; 318/139, 318/799, 801, 802, 808, 809, 803, 804, 810, 318/811
See application file for complete search history.

(56) References Cited

U.S. PATENT DOCUMENTS

| | | | |
|---|---|---|---|
| 4,467,408 A | | 8/1984 | Matulevich et al. |
| 4,719,400 A | * | 1/1988 | Kurakake et al. ............ 318/811 |
| 4,999,561 A | | 3/1991 | Kaga et al. |
| 5,052,908 A | | 10/1991 | Inaba et al. |
| 5,373,195 A | * | 12/1994 | De Doncker et al. ......... 307/45 |
| 5,373,223 A | | 12/1994 | Akagi et al. |
| 5,420,777 A | | 5/1995 | Muto |
| 5,576,606 A | * | 11/1996 | Nguyen Phuoc et al. ... 318/801 |

(Continued)

FOREIGN PATENT DOCUMENTS

| | | |
|---|---|---|
| EP | 0 483 852 A2 | 5/1992 |
| JP | 8-214592 | 8/1996 |
| JP | A 9-247992 | 9/1997 |
| JP | A 10-127050 | 5/1998 |
| JP | 10-136570 | 5/1998 |
| JP | 10337087 A | 12/1998 |
| JP | A-63-305754 | 12/1998 |
| JP | A 11-69882 | 3/1999 |
| JP | A 11-103592 | 4/1999 |
| JP | A-11-262256 | 9/1999 |
| JP | A 11-299290 | 10/1999 |
| JP | A 2000-324891 | 11/2000 |
| JP | A 2000-333469 | 11/2000 |
| JP | A 2001-157487 | 6/2001 |
| JP | A-2001-186768 | 7/2001 |
| JP | 1 286 459 A1 | 2/2003 |

OTHER PUBLICATIONS

U.S. Pat. No. 10/484,385, filed Jan. 21, 2003, Sato et al.

*Primary Examiner*—Rajnikant B. Patel
(74) *Attorney, Agent, or Firm*—Oliff & Berridge, PLC

(57) ABSTRACT

An electronic control unit (40) calculates the current flowing through a reactor (L) by dividing an output required BP* of a battery (32), obtained from converting the power required by a motor (22), by a terminal voltage Vb of the battery (32). A carrier frequency (optimum carrier frequency) is set for transistors (T7, T8) where the loss of a DC/DC converter (34) is minimized from the calculated current, and the DC/DC converter (34) is controlled at the set switching frequency.

14 Claims, 7 Drawing Sheets

U.S. PATENT DOCUMENTS

| | | |
|---|---|---|
| 5,710,699 A | 1/1998 | King et al. |
| 5,815,569 A | 9/1998 | Akhteruzzaman |
| 6,048,289 A | 4/2000 | Hattori et al. |
| 6,066,928 A | 5/2000 | Kinoshita et al. |
| 6,137,704 A | 10/2000 | Ito et al. |
| 6,204,627 B1 * | 3/2001 | Watanabe et al. ........... 318/729 |
| 6,329,791 B1 | 12/2001 | Yokoyama et al. |
| 6,333,612 B1 | 12/2001 | Suzuki et al. |
| 6,486,632 B1 * | 11/2002 | Okushima et al. .......... 318/599 |
| 6,700,802 B1 | 3/2004 | Ulinski et al. |
| 6,831,442 B1 | 12/2004 | Hsu et al. |
| 2003/0057914 A1 | 3/2001 | Watanabe et al. |
| 2003/0081440 A1 | 5/2003 | Komatsu et al. |
| 2003/0117823 A1 | 6/2003 | Sato |
| 2004/0145338 A1 | 7/2004 | Nakamura et al. |

\* cited by examiner

DRIVE APPARATUS, CONTROL METHOD FOR THE DRIVE APPARATUS, STORAGE MEDIUM STORING A PROGRAM CONTROLLING THE DRIVE APPARATUS, AND POWER OUTPUT APPARATUS

BACKGROUND OF THE INVENTION

1. Field of the Invention

The present invention relates to a drive apparatus, a control method for the drive apparatus, a storage medium in which is stored a program controlling the drive apparatus, and a power output apparatus.

2. Description of the Prior Art

Heretofore, an apparatus has been proposed for this type of power output apparatus comprising a capacitor that is connected to a positive bus line and a negative bus line of an inverter circuit for applying a three-phase alternating current to a motor, and a DC/DC converter capable of performing DC/DC conversion on the power from the DC power source and supplying to the capacitor. In this power output apparatus, a charge is stored into the capacitor by using a reactor for temporarily storing the current of the DC power source as energy and stepping up the voltage of the DC power source, and the motor is driven with this charged capacitor as a DC power source. The voltage step-up operation by the DC/DC converter is fixed at a switching frequency (carrier frequency) where the efficiency is considered suitable at a given operating point, and is performed by controlling the switching at this fixed switching frequency.

However, in this sort of power output apparatus, there is a problem in some instances where the DC/DC converter is not necessarily driven at an optimum switching frequency and the energy efficiency drops. The DC/DC converter operates according to the output (output requirement) required by the power output apparatus, and the point of the switching frequency where the efficiency is suitable also varies depending on the output requirement. Therefore, when driving the DC/DC converter at a fixed switching frequency, there are instances where the operation occurred at a poor efficiency point depending on the output requirement of the apparatus. The drop in energy efficiency of the DC/DC converter causes a drop in the energy efficiency of the overall apparatus.

SUMMARY OF THE INVENTION

It is an object of the drive apparatus of the present invention to further improve the energy efficiency of the overall apparatus by driving a DC/DC converter at a more efficient switching frequency. Furthermore, it is an object of the power output apparatus of the present invention to further improve the energy efficiency of the overall apparatus by performing power conversion between a first power source and a second power source at a more efficient switching frequency.

The drive apparatus and the power output apparatus of the present invention employ the following means to achieve at least one of the above-mentioned objects.

The drive apparatus of the present invention comprises:

a DC/DC converter having an energy storing device capable of storing DC current as energy, and being capable, by using the energy storing device, of performing DC/DC conversion on an input DC voltage by the switching of a switching element and outputting to a load;

a power source capable of outputting DC power to the DC/DC converter;

a controller for setting a switching frequency for the switching element on the basis of loss characteristics of the DC/DC converter corresponding to current flowing through the energy storing device, and for controlling the switching of the switching element at the set frequency.

In the drive apparatus of the present invention, the controller set the switching frequency for the switching element of the DC/DC converter on the basis of loss characteristics of the DC/DC converter corresponding to current flowing through the energy storing device, and by using the set switching frequency, control the switching of the switching element. By setting the switching frequency where the loss of the DC/DC converter is smaller in accordance with the current flowing through the energy storing device, the DC/DC converter can be driven more efficiently. As a result, the energy efficiency of the overall apparatus can be further improved. The loss characteristics given here refer to the relationship between the switching frequency and the loss.

In this sort of drive apparatus of the present invention, the loss characteristics of the DC/DC converter may be obtained from the loss characteristics of the energy storing device and the loss characteristics of the switching element.

Furthermore, the drive apparatus of the present invention may comprise a current calculator for calculating the current flowing through the energy storing device on the basis of the output required by the load and the voltage of the power source, or may comprise a current detector for directly detecting the current flowing through the energy storing device.

A control method for the drive apparatus of the present invention is a control method for a drive apparatus comprising a DC/DC converter having an energy storing device capable of storing DC current as energy, and being capable, by using the energy storing device, of performing DC/DC conversion on an input DC voltage by the switching of a switching element and outputting to a load, and a power source capable of supplying DC power to the DC/DC converter, comprising the steps of:

setting the switching frequency for the switching element on the basis of loss characteristics of the DC/DC converter corresponding to current flowing through the energy storing device; and controlling the switching of the switching element at the set frequency.

In the control method for the drive apparatus of the present invention, the switching frequency for the switching element of the DC/DC converter is set using the loss characteristics of the DC/DC converter corresponding to current flowing through the energy storing device, and switching control is performed on the switching element at the set switching frequency. By setting the switching frequency where the loss of the DC/DC converter is smaller in accordance with the current flowing through the energy storing device, the DC/DC converter can be driven more efficiently. As a result, the energy efficiency of the overall drive apparatus can be further improved.

The storage medium of the present invention for storing a program controlling the operation of a drive apparatus comprising a DC/DC converter having an energy storing device capable of storing DC current as energy, and being capable, by using the energy storing device, of performing DC/DC conversion on an input DC voltage by the switching of a switching element and outputting to a load, and a power source capable of supplying DC power to the DC/DC converter;

is a computer readable storage medium in which is stored a program for executing by a computer:

a frequency set processing step for setting the switching frequency for the switching element on the basis of loss characteristics of the DC/DC converter corresponding to current flowing through the energy storing device; and a control processing step for controlling the switching of the switching element at the set frequency.

In the storage medium of the present invention, the computer can function as the controller to set the switching frequency for the switching element of the DC/DC converter by using the loss characteristics of the DC/DC converter corresponding to current flowing through the energy storing device, and to control the switching of the switching element at the set switching frequency. Therefore, by setting the switching frequency where the loss of the DC/DC converter is smaller in accordance with the current through the energy storing device, the DC/DC converter can be driven more efficiently. As a result, the energy efficiency of the overall drive apparatus can be further improved.

A first power output apparatus of the present invention comprises:

a motor rotationally driven by a polyphase alternating current;

an inverter circuit capable of supplying polyphase alternating current power to the motor by the switching of a switching element;

a chargeable first power source that is connected to a positive bus line and a negative bus line of the inverter circuit;

a second power source that is connected to either the positive bus line or the negative bus line of the inverter and to a neutral point of the motor;

a controller for setting the switching frequency for the switching element on the basis of loss characteristics of a power converter capable of converting power from the second power source and supplying to the first power source, including the switching element of the inverter and a coil of the motor, corresponding to current flowing through the neutral point of the motor, and for controlling the switching of the switching element at the set frequency.

In the first power output apparatus of the present invention, the controller set the switching frequency for the switching element of the inverter circuit using the loss characteristics of the power converter corresponding to current flowing through a neutral point of the motor, and at this set switching frequency, and control the switching of the switching element. By setting the switching frequency where the loss of the power converter is smaller in accordance with the current flowing through the neutral point of the motor, a more efficient power conversion operation can be performed. As a result, the energy efficiency of the overall power output apparatus can be further improved.

A second power output apparatus of the present invention comprises:

a motor rotationally driven by a polyphase alternating current;

an inverter circuit capable of supplying polyphase alternating current power to the motor by the switching of a switching element;

a chargeable first power source that is connected to either one of a positive bus line or a negative bus line of the inverter circuit and to a neutral point of the motor;

a second power source that is connected to one of the positive bus line and the negative bus line, which is not connected with the first power source, of the inverter and to the neutral point of the motor;

a controller for setting the switching frequency for the switching element on the basis of loss characteristics of a power converter capable of converting power from the second power source and supplying to the first power source, including the switching element of the inverter and a coil of the motor, corresponding to current flowing through the neutral point of the motor, and for controlling the switching of the switching element at the set frequency.

In the second power output apparatus of the present invention, a similar effect to that of the first power output apparatus can be achieved.

In the first or second power output apparatus of the present invention, the loss characteristics of the power converter may also be obtained using the loss characteristics of the phase coils of the motor and the loss characteristics of the switching element.

Furthermore, the first or second power output apparatus of the present invention may comprise a current calculator for calculating the current flowing through the neutral point of the motor on the basis of the output required by the power output apparatus and the voltage of the second power source, or may comprise a current detector for directly detecting the current flowing through the neutral point of the motor.

DETAILED DESCRIPTION OF THE PREFERRED EMBODIMENTS

Figure 1:
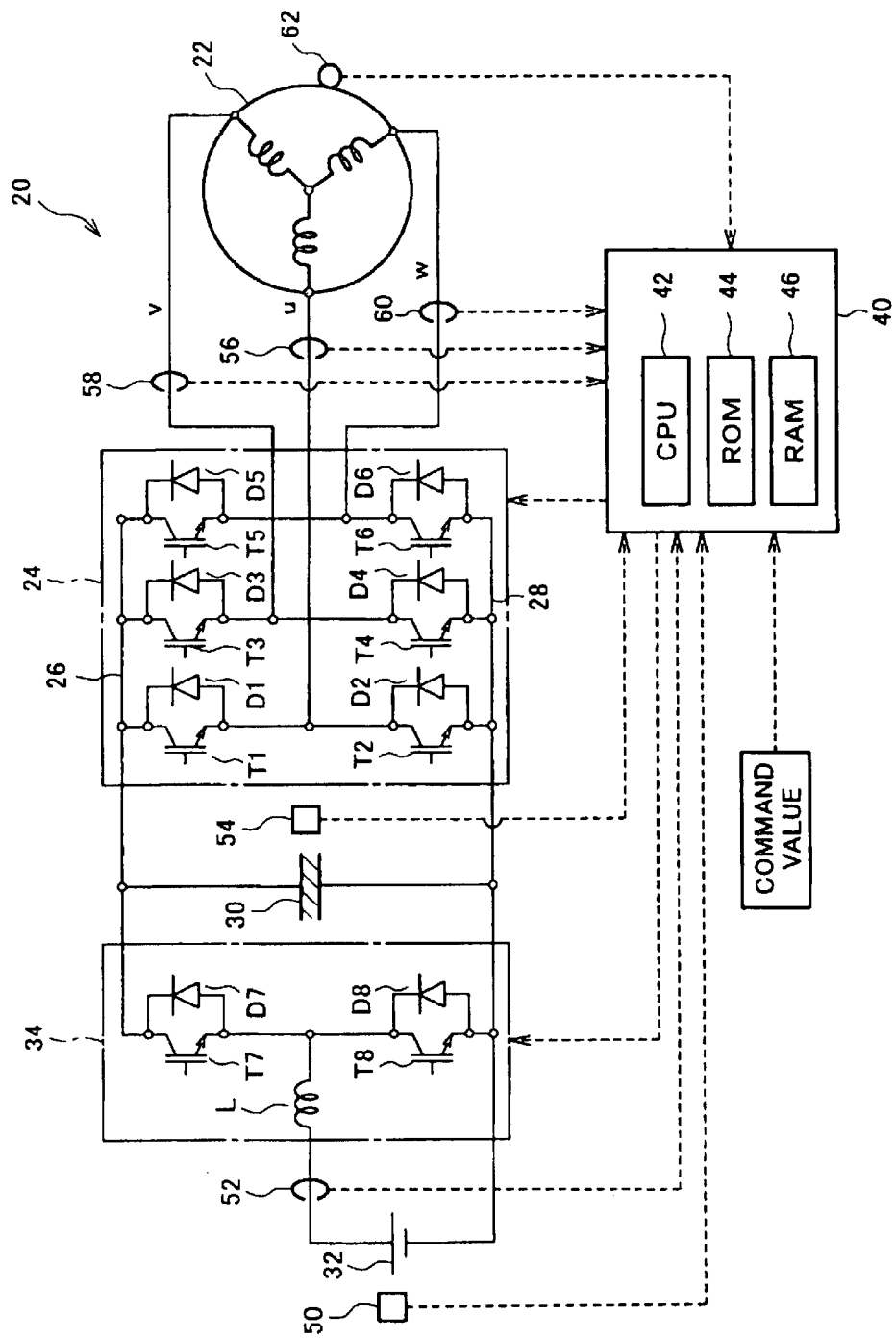
FIG. 1 shows an overall configuration of a power output apparatus 20, which is the preferred first embodiment of the present invention.

Next, embodiments of the present invention will be described using embodiments. FIG. 1 shows an overall configuration of the power output apparatus 20, which is the preferred first embodiment of the present invention. The power output apparatus 20 of this embodiment comprises a motor 22 that is rotationally driven by a three-phase alternating current, an inverter circuit 24 capable of converting DC power into three-phase AC power and supplying it to the motor 22, a capacitor 30 that is connected to a positive bus line 26 and a negative bus line 28 of the inverter circuit 24, a battery 32 capable of being charged and discharged, a DC/DC converter 34 capable of performing DC/DC conversion on the DC voltage from the battery 32 and supplying it to the capacitor 30, and an electronic control unit 40 for setting a switching frequency (carrier frequency) for the DC/DC converter 34 and controlling the overall apparatus.

The motor 22 is, for example, configured as a synchronous generator-motor that is capable of electric power generation from a rotor, to which is attached a permanent magnetic on its outer surface, and a stator wound with three-phase coils. The rotary shaft of the motor 22 is the output shaft of the power output apparatus 20 of this embodiment and power is output from this rotary shaft. Furthermore, since the motor 22 of this embodiment is configured as a generator-motor, electric power generation by the motor 22 is possible if power is input by the rotary shaft of the motor 22. It should be noted that if the power output apparatus 20 of this embodiment is mounted on a vehicle, the rotary shaft of the motor 22 will be connected directly or indirectly to an axle of the vehicle.

The inverter circuit 24 is configured from six transistors T1 to T6 and six diodes D1 to D6. The six transistors T1 to T6 are arranged as pairs of transistors on the source side and sink side respectively with respect to the positive bus line 26 and the negative bus line 28, and to each connection point between the source side and the sink side is connected the respective three-phase coils (uvw) of the motor 22. Therefore, by controlling the proportion of the ON time of the paired transistors, T1 to T6, in a state where a potential difference acts between the positive bus line 26 and the negative bus line 28, a rotating magnetic field is formed by the three-phase coils of the motor 22 so as to enable the rotational drive of the motor 22.

The battery 32 is configured, for example, as a nickel-hydride based or lithium-ion based secondary cell. The battery 32 is formed, for example, with a capacity larger than the capacity of the capacitor 30 at the same voltage.

The DC/DC converter 34 comprises two transistors T7 and T8 arranged at the respective source side and sink side with respect to the positive bus line 26 and the negative bus line 28 of the inverter circuit 24, two diodes D7 and D8 arranged in an inverse-parallel connection with the respective transistors T7 and T8, and a reactor L that is connected to a common connection point of transistors T7 and T8.

The electronic control unit 40 is configured as a microprocessor centering on a CPU 42, and comprises a ROM 44 in which is stored a processing program, a RAM 46 for temporarily storing data, and an input/output port (not shown). The electronic control unit 40 inputs, via an input port, a voltage Vb from a voltage sensor 50 for detecting the terminal voltage of the battery 32 and a reactor current I1 from a current sensor 52 for detecting the current flowing through the reactor L, a voltage Vc from a voltage sensor 54 for detecting the terminal voltage of the capacitor 30, phase currents Iu, Iv, and Iw from current sensors 56 to 60 for detecting the current flowing through each phase of the three-phase coils of the motor 22, a motor angle of revolution θ from a revolution angle sensor 62 attached to the rotary shaft of the motor 22, a command value relating to the operation of the motor 22, and so forth. It should be noted that any one of the current sensors 56 to 60 may be omitted. Furthermore, the electronic control unit 40 outputs, via an output port, control signals for performing switching control of the transistors T1 to T6 of the inverter circuit 24, control signals for performing switching control of transistors T7 and T8 of the DC/DC converter 34, and so forth.

Figure 2:
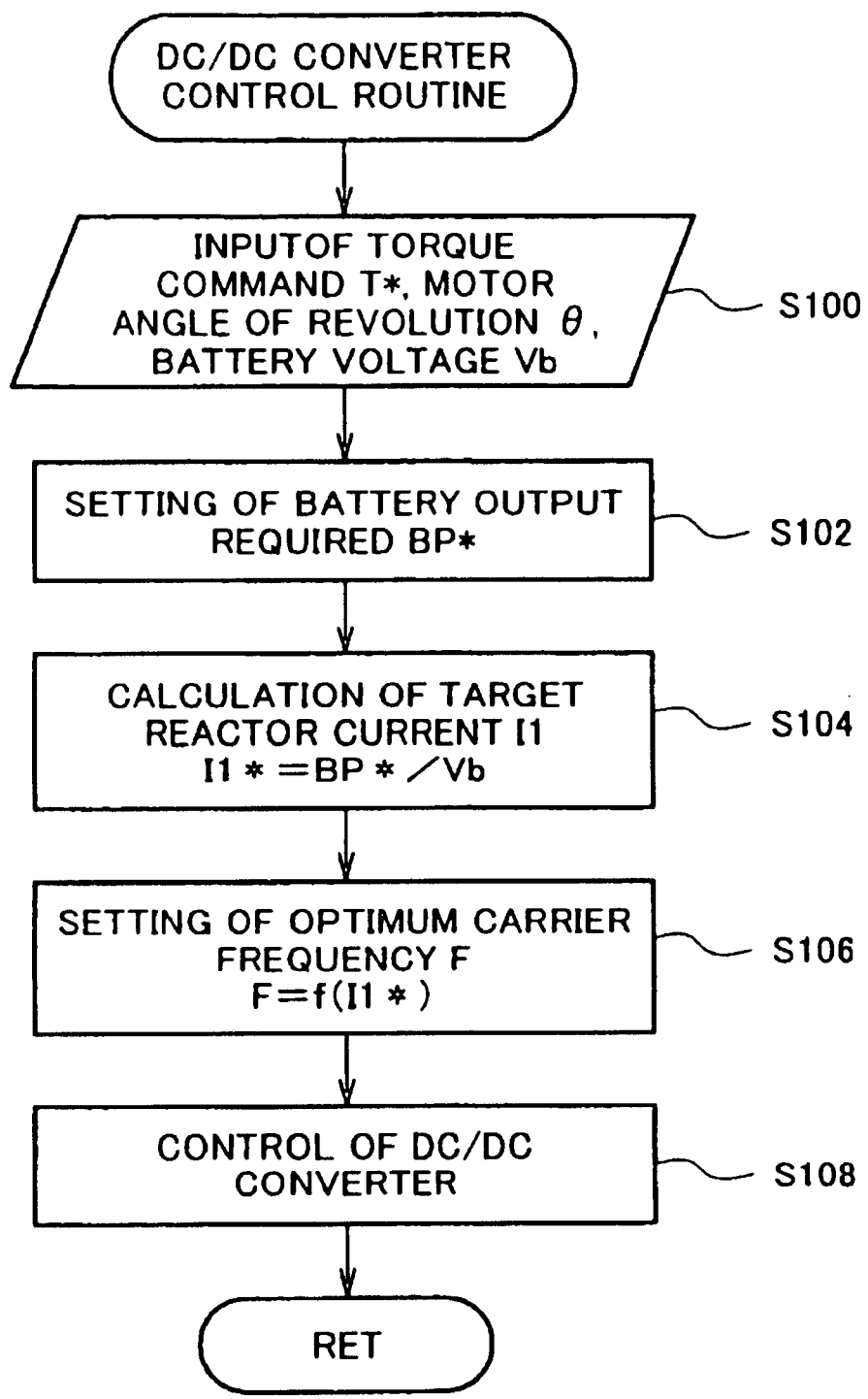
FIG. 2 is a flowchart showing an example of a DC/DC converter control routine that is executed by an electronic control unit 40 of the power output apparatus 20 of the preferred first embodiment.

The operation of the power output apparatus 20 of this embodiment configured in this manner, particularly the operation for controlling the DC/DC converter 34, will be described. FIG. 2 is a flowchart showing an example of a DC/DC converter control routine that is executed by the electronic control unit 40 of the power output apparatus 20 of this embodiment. This routine is repeatedly executed at a predetermined interval (such as every 20 ms).

When the DC/DC converter control routine is executed, the CPU 42 of the electronic control unit 40 first reads (step S100) the torque command T* as the torque to be output by the motor 22, the motor angle of revolution θ from the revolution angle sensor 62, and the voltage Vb of the battery 32 from the voltage sensor 50, then calculates (step S102) the output required BP* of the battery 32, which is the electric power necessary when driving the motor 22, on the basis of the torque command T* for the motor 22 that is read and the rpm N of the motor 22 that is calculated on the basis of the motor angle of revolution θ. The output required BP* of the battery 32 is calculated as an electric power by converting a drive power from the motor 22. If the power output apparatus 20 includes another accessory that is driven using electric power (output from DC/DC converter 34) from the battery 32, the power necessary to drive the accessory is added to the power that is calculated by converting the drive power from the motor 22. Instead of calculating the rpm N of the motor 22 on the basis of the angle of revolution θ from the revolution angle sensor 62, a known rpm sensor may be provided to directly detect the rpm N.

When the output required BP* of the battery 32 is calculated in this manner, the target reactor current I1* to be applied to the reactor L of the DC/DC converter 34 is calculated (step S104) by dividing the calculated output required BP* by the terminal voltage Vb of the battery 32, an optimum carrier frequency F, which is a carrier frequency that is optimum for efficiently switching the transistors T7 and T8 of the DC/DC converter 34, is set (step S106) from the calculated target reactor current I1*, and the DC/DC converter 34 is controlled (step S108) using the optimum carrier frequency F so that the target reactor current I1* flows to the reactor L, thereby terminating the routine. The setting of the optimum carrier frequency F will be described here.

Figure 3:
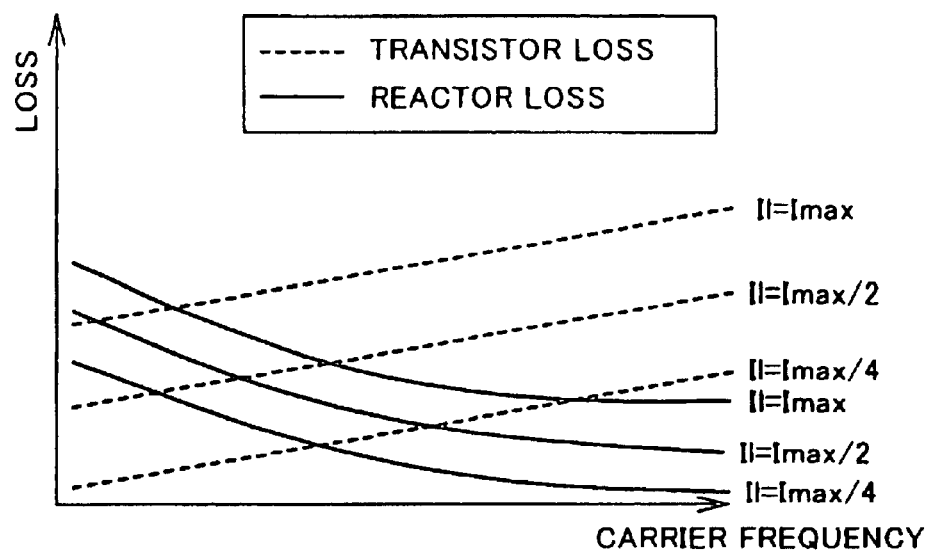
FIG. 3 shows the relationship between the carrier frequency and the loss of the reactor L, and the relationship between the carrier frequency and the loss (switching loss) of transistors T7 and T8.

FIG. 3 shows the relationship between the carrier frequency and the loss of the reactor L (solid lines), and the relationship between the carrier frequency and the loss (switching loss) of transistors T7 and T8 (broken lines), when a current flowing through the reactor L is changed. As shown by the solid lines in FIG. 3, the loss of the reactor L increases as the current flowing through the reactor L increases or as the carrier frequency lowers. On the other hand, as shown by the dotted lines in FIG. 3, the loss of transistors T7 and T8 increases as the current flowing through the reactor L increases or as the carrier frequency rises. If the loss of the DC/DC converter 34 is now considered as a sum of the loss of the reactor L and the loss of transistors T7 and T8, the loss characteristics of the DC/DC converter 34 depended on the current flowing through the reactor L have the characteristics shown by the broken lines in FIG. 4. Therefore, by setting the carrier frequency where the loss of the DC/DC converter 34 is minimized on the basis of the current flowing through the reactor L, the DC/DC converter 34 can be efficiently driven.

Figure 4:
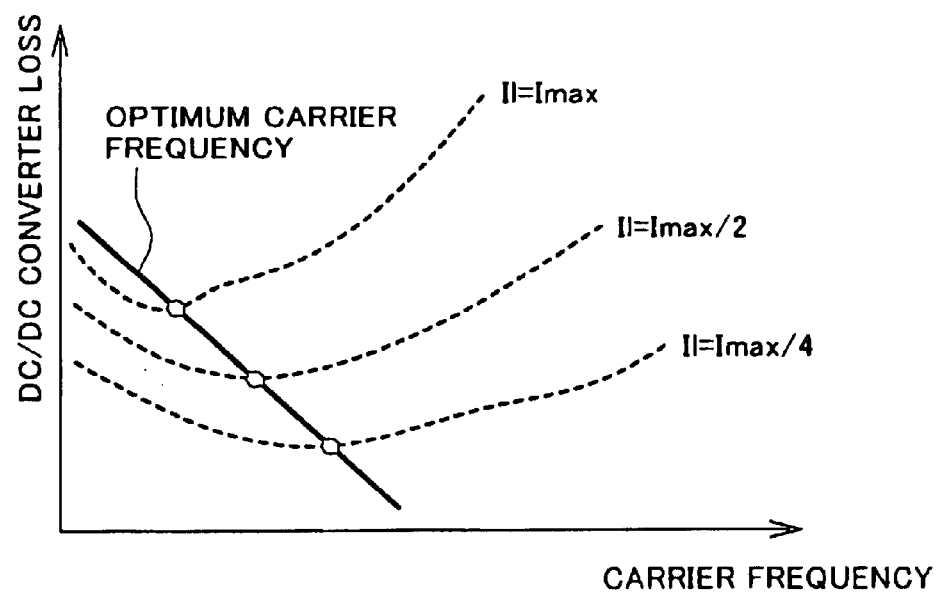
FIG. 4 shows the relationship between the carrier frequency at currents flowing through the reactor L and the loss of a DC/DC converter 34.

For the setting of the optimum carrier frequency F in step S106 in this embodiment, the relationship of the target reactor current I1* and the optimum carrier frequency F is obtained in advance, such as by experimentation, and stored into the ROM 44, and when the target reactor current I1* is obtained, the corresponding optimum carrier frequency F is derived from a map. The solid line in FIG. 4 represents the map showing the relationship between the target reactor current I1* and the optimum carrier frequency F.

Controlling the inverter circuit 24 in this manner, using the DC power that is converted by the DC/DC converter 34 and stored in the capacitor 30, drives the motor 22. When driving the motor 22, for example, the command currents Iu*, Iv*, and Iw* to be supplied to the respective phase of the three-phase coils of the motor 22 are calculated from the torque command T* for the motor 22. The command voltages Vu*, Vv*, and Vw* for the respective phases of the motor 22 are calculated on the basis of the command currents Iu*, Iv*, and Iw*, and the respective phase currents Iu, Iv, and Iw, which are detected by the current sensors 56 to 60. Then, a PWM signal is generated on the basis of the command voltages Vu*, Vv*, and Vw*, and the voltage Vc of the capacitor 30, which is detected by the voltage sensor 54, and the PWM signal is output to the inverter circuit 24.

According to the power output apparatus 20 of this embodiment described above, the target reactor current I1* flowing through the reactor L is calculated on the basis of the power (power requirement) required by the motor 22 and the terminal voltage Vb of the battery 32, and the optimum carrier frequency F is set where the loss of the DC/DC converter 34 is minimized on the basis of the target reactor current I1*. Using this setting to drive the DC/DC converter 34, it enables the energy efficiency of the DC/DC converter 34 to be improved. As a result, the energy efficiency of the overall power output apparatus 20 can be further improved.

At the power output apparatus 20 of this embodiment, the target reactor current I1* is calculated on the basis of the power required by the motor 22 and the voltage Vb of the battery 32, and the optimum carrier frequency F is set from the calculated target reactor current I1*. However, the current flowing through the reactor L may be detected directly by the DC current sensor 52 and the optimum carrier frequency F may also be set from the detected current.

At the power output apparatus 20 of this embodiment, the optimum carrier frequency F is set where the loss of the DC/DC converter 34 (loss of the reactor L and transistors T7 and T8) is minimized. However, if a slight increase in loss is allowable, the carrier frequency may be set within an allowable range centering on the optimum carrier frequency F.

The power output apparatus 20 of this embodiment is applied to the case where the motor 22 is driven using the battery 32 as the power source. However, it may also be applied to a case where a general load that consumes power is driven.

Figure 5:
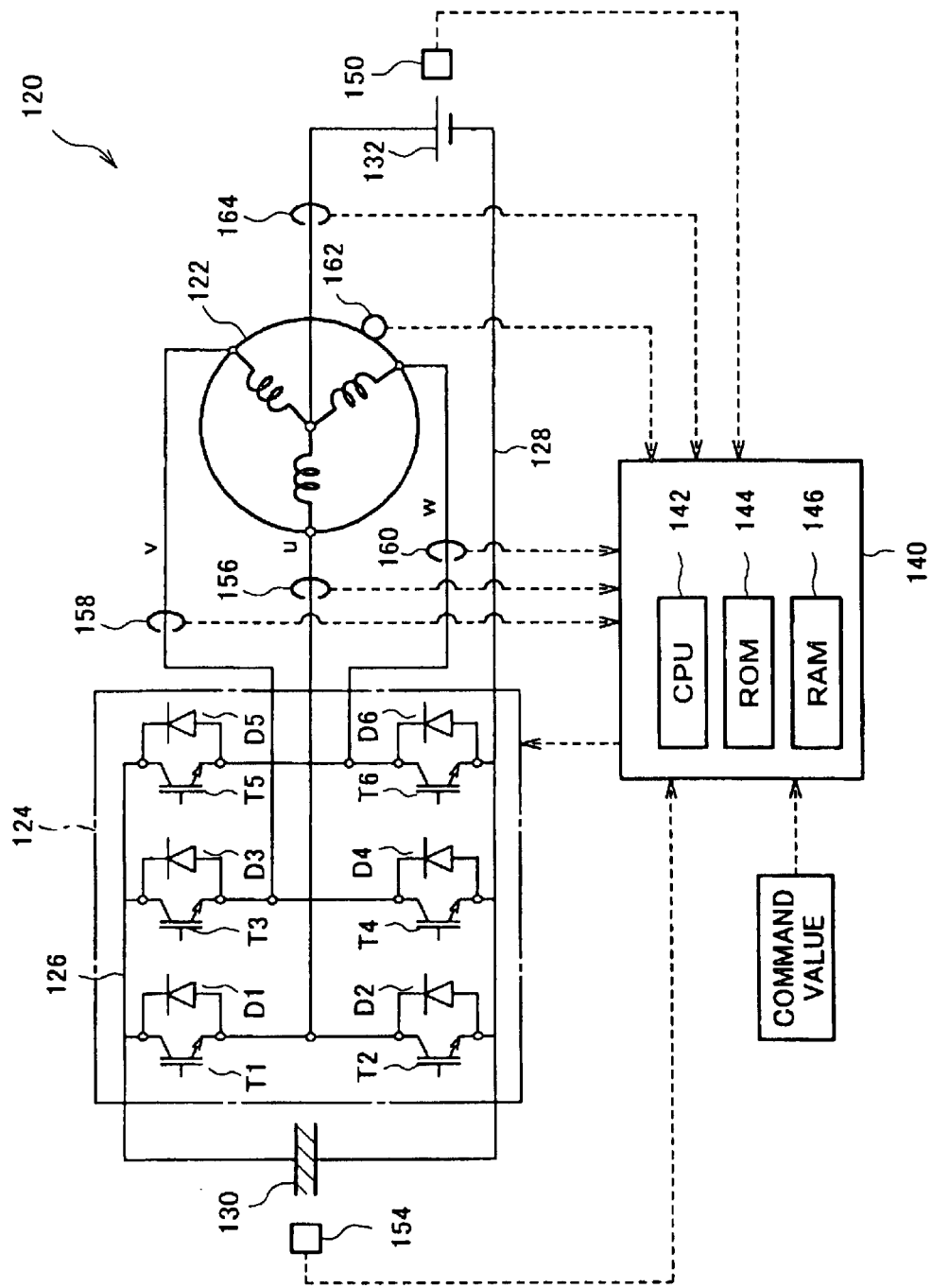
FIG. 5 shows an overall configuration of a power output apparatus 120 of the second embodiment.

A power output apparatus 120 of the second embodiment of the present invention will be described next. FIG. 5 shows the overall configuration of the power output apparatus 120 of the second embodiment. As shown in the figure, the power output apparatus 120 of the second embodiment comprises a motor 122 that is rotationally driven by a three-phase alternating current, an inverter circuit 124 capable of converting DC power to three-phase AC power and supplying it to the motor 122, a capacitor 130 that is connected to a positive bus line 126 and a negative bus line 128 of the inverter circuit 124, a DC power source 132 that is connected to a neutral point of the motor 122 and to the negative bus line 128 of the inverter circuit 124, and an electronic control unit 140 for controlling the overall apparatus. The power output apparatus 120 of the second embodiment has a similar configuration to the power output apparatus 20 of the first embodiment, except that the inverter circuit 124 operates the same function, by switching the transistors T1 to T6 of with each phase coil of the motor 22 functioning as a reactor, as the step-up/down operation of the DC/DC converter 34 in the power output apparatus 20 of the first embodiment. Therefore, with respect to the elements that correspond to the power output apparatus 20 of the first embodiment, a "100" is added to their reference numerals and their detailed descriptions will not be repeated.

Figure 6:
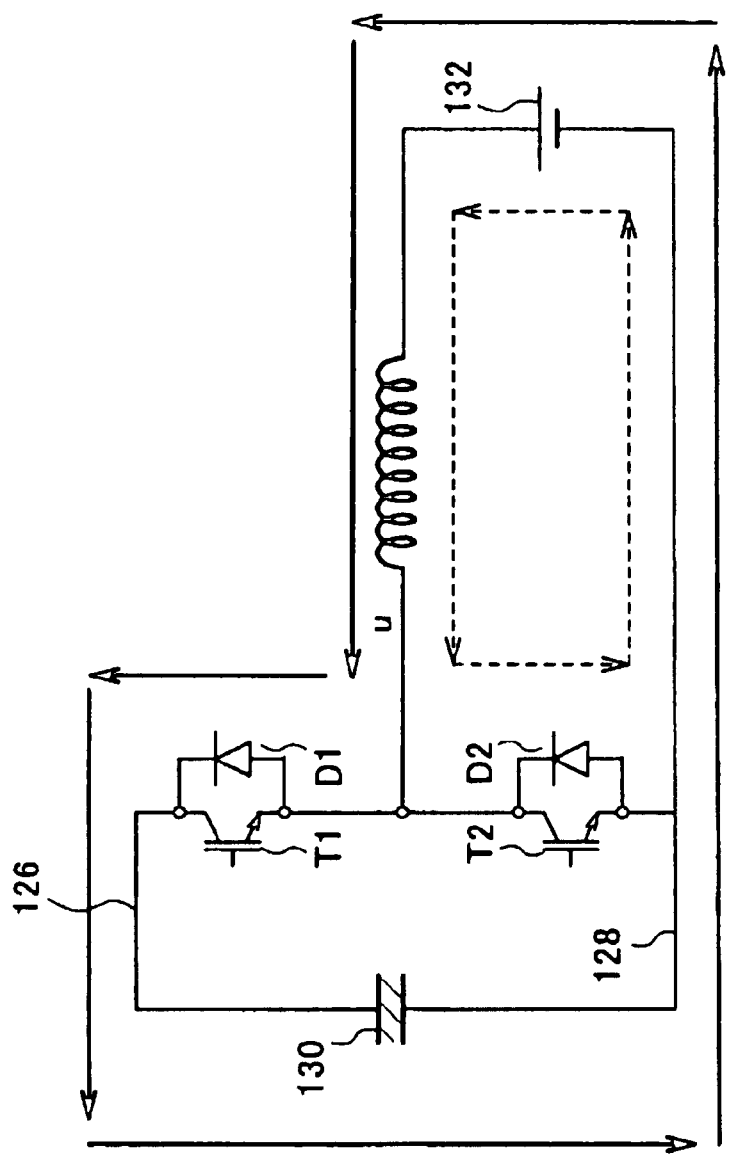
FIG. 6 is a circuit diagram focusing on phase u of three-phase coils of a motor 122.

The step-up/down operation based on each phase coil of the motor 122 and the transistors T1 to T6 of the inverter circuit 124 will be described next. FIG. 6 is a circuit diagram of the power output apparatus 120 of the second embodiment focusing on phase u of the three-phase coils of the motor 122. When the state in which the transistor T2 for phase u of the inverter circuit 124 is turned ON is now considered, a short circuit shown by the broken lines in the figure is formed in this state so that phase u of the three-phase coils of the motor 122 functions as a reactor. When the transistor T2 is turned OFF from this state, the energy stored in phase u of the three-phase coils functioning as the reactor is stored into the capacitor 130 by the circuit shown by the solid lines in the figure. The voltage at this time can be set higher than the supply voltage of the battery 132. On the other hand, the battery 132 can be charged by the potential of the capacitor 130 using this circuit. Therefore, this circuit can be considered to be a step-up/down chopper circuit that is capable of stepping up the energy of the battery 132 and stores it into the capacitor 130, and charging the battery 132 by the potential of the capacitor 130. Similar to phase u, phases v and w of the three-phase coils of the motor 122 can also be considered to be step-up/down chopper circuits. Thus, the capacitor 130 can be charged by turning ON and OFF the transistors T2, T4, and T6, or the battery 132 can be charged by the charge stored in the capacitor 130. The potential difference caused by charging the capacitor 130 fluctuates according to the amount of charge that is stored in the capacitor 130, namely, the current flowing through the reactor, so that the terminal voltage of the capacitor 130 can be adjusted by controlling the switching of the transistors T2, T4, and T6 of the inverter circuit 124 to adjust the current flowing through the reactor. To drive the motor 122 with this circuit, a pseudo-three-phase alternating current may be supplied to the three-phase coils of the motor 122 by controlling the switching of the transistors T1 to T6 of the inverter circuit 124. At this time, if a DC component is added to this three-phase alternating current, namely, if the potential of this three-phase alternating current is offset to the positive side or negative side then supplied to the motor 122, the motor 122 can be rotationally driven by the AC component and the DC component can be stored into the capacitor 130. Therefore, by controlling the switching of the transistors T1 to T6 of the inverter circuit 124, the motor 122 can be driven while the terminal voltage of the capacitor 130 is adjusted. The terminal voltage of the capacitor 130 is adjusted, for example, so that it is approximately double the terminal voltage of the battery 132.

In this manner, the circuit formed from the phase coils of the motor 122 and the transistors T1 to T6 and the diodes D1 to D6 of the inverter circuit 124 can be considered to be a step-up/down chopper circuit, which corresponds similarly to the DC/DC converter 34 of the power output apparatus 20 of the first embodiment. Therefore, if the optimum carrier frequency F is set where the loss based on the step-up/down operation of this circuit is minimized, the energy efficiency of the power output apparatus 120 of the second embodiment can be further improved. The setting of the optimum carrier frequency F can be performed as follows. First, the target neutral point current Io* flowing through the neutral point of the motor 122 is calculated. The target neutral point current Io* is calculated by dividing the output required BP*, calculated as an electric power by converting a drive power from the motor 122, (if another accessory that consumes electric power from the battery 132 exists, the power required by that accessory is added) by the voltage Vb of the battery 132. Next, from the target neutral point current Io*, the optimum carrier frequency F is derived using the loss characteristics similar to those shown by the solid line of FIG. 4. Naturally, the current flowing to the neutral point of the motor 122 may be directly detected by a current sensor 164, and the optimum carrier frequency F may be calculated using the detected current.

According to the power output apparatus 120 of the second embodiment described above, the target neutral point current Io* flowing through the neutral point of the motor 122 is calculated on the basis of the power required by the motor 122 (battery required power BP*) and the terminal voltage Vb of the battery 132. On the basis of the target neutral point current Io*, the optimum switching frequency F is set where the loss of the circuit part functioning as the step-up/down chopper circuit is minimized. Thus, by driving the inverter circuit 124 using this setting, the energy loss associated with the step-up/down operation can be further reduced. As a result, the energy efficiency of the overall power output apparatus 120 of the second embodiment can be further improved.

Figure 7:
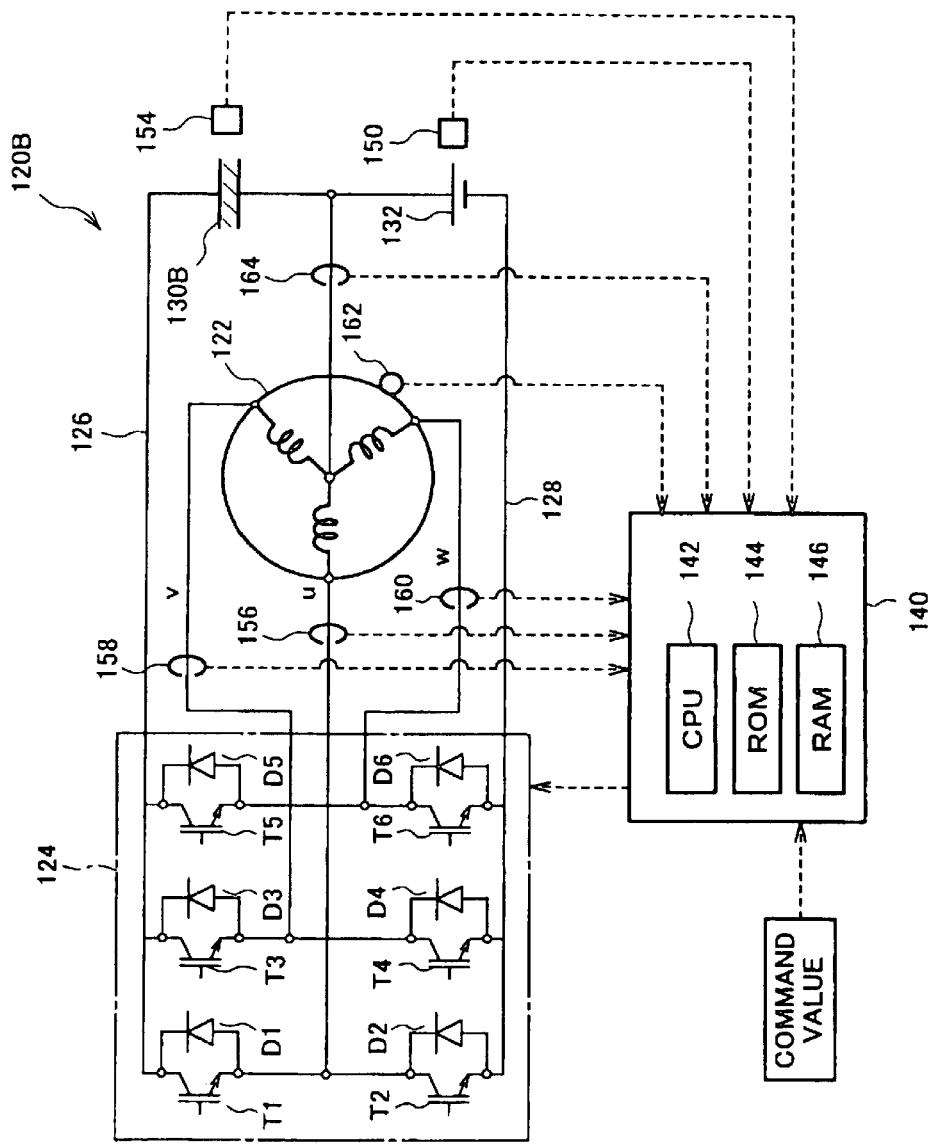
FIG. 7 shows an overall configuration of a power output apparatus 120B of a modification embodiment.

In the power output apparatus 120 of the second embodiment, the capacitor 130 is attached so as to connect to the positive bus line 126 and to the negative bus line 128 of the inverter circuit 124. However, a capacitor 130B may be attached so as to connect to the positive bus line 126 of the inverter circuit 124 and to the neutral point of the motor 122 as shown in a power output apparatus 120B of the modified embodiment of FIG. 7. In the power output apparatus 120B of this modified embodiment, a DC power source for a voltage being the sum of the terminal voltage from the capacitor 130B and the terminal voltage from the battery 132 is attached so as to connect to the positive bus line 126 and to the negative bus line 128 of the inverter circuit 124. This configuration can be considered to be similar to the configuration of the power output apparatus 120 of the second embodiment where the capacitor 130 is attached so as to connect to the positive bus line 126 and to the negative bus line 128 of the inverter circuit 124.

Figure 8:
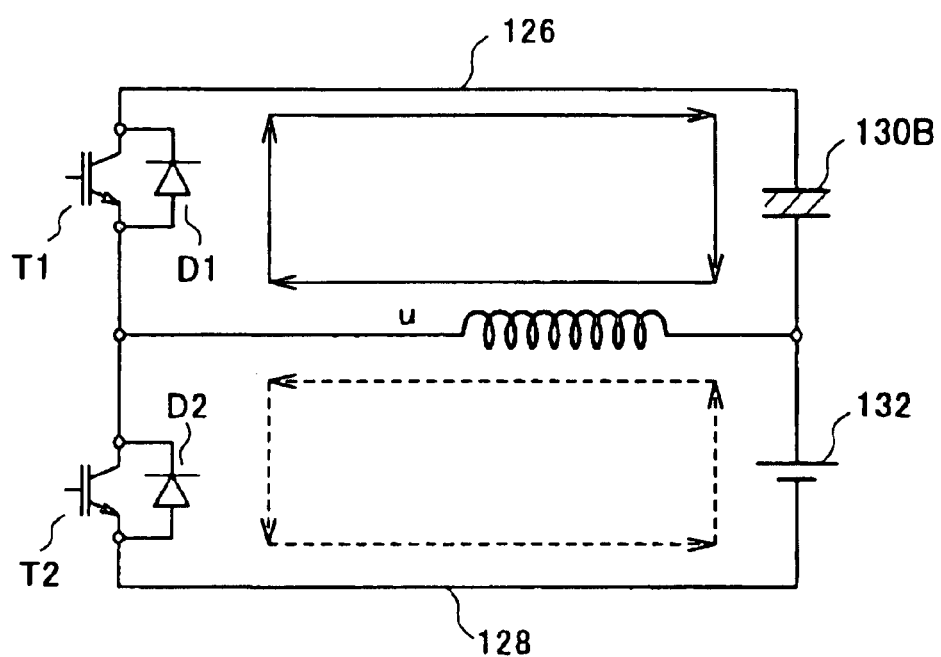
FIG. 8 is a circuit diagram focusing on phase u of three-phase coils of the motor 122.

FIG. 8 is a circuit diagram of the power output apparatus 120B of the modification embodiment focusing on phase u of the three-phase coils of the motor 122. When the state in which the transistor T2 is turned ON is now considered, a short circuit shown by the broken lines in the figure is formed so that phase u of the three-phase coils of the motor 122 functions as a reactor. When the transistor T2 is turned OFF from this state, the energy stored in phase u of the three-phase coils functioning as the reactor is stored into the capacitor 130B by the circuit shown by the solid lines in the figure. On the other hand, by turning OFF the circuit transistor T1 from the ON state, the battery 132 can be likewise charged by the charge of the capacitor 130B. Therefore, this circuit stores the energy of the battery 132 into the capacitor 130B, and can be considered to be a chopper circuit that is capable of charging the battery 132 by the potential of the capacitor 130B. Similar to phase u, phases v and w of the motor 122 can also be considered to be chopper circuits. Thus, by turning ON and OFF the transistors T1 to T6, the capacitor 130B can be charged and the battery 132 can be charged by the charge stored in the capacitor 130B. The potential difference caused by charging the capacitor 130B fluctuates according to the amount of charge that is stored in the capacitor 130B, namely, the current flowing through the reactor, so that the terminal voltage of the capacitor 130B can be adjusted by controlling the switching of the transistors T1 to T6 of the inverter circuit 124 to adjust the current flowing through the reactor. To drive the motor 122 with this circuit, a pseudo-three-phase alternating current may be supplied to the three-phase coils of the motor 122 by controlling the switching of the transistors T1 to T6 of the inverter circuit 124. At this time, if a DC component is added to this three-phase alternating current, namely, if the potential of this three-phase alternating current is offset to the positive side or negative side then supplied to the motor 122, the motor 122 can be rotationally driven by the AC component and the DC component can be stored into the capacitor 130B. Therefore, by controlling the switching of the transistors T1 to T6 of the inverter circuit 124, the motor 122 can be driven while the terminal voltage of the capacitor 130B is adjusted. The terminal voltage of the capacitor 130B is adjusted, for example, so that it is substantially the same as the terminal voltage of the battery 132.

Therefore, in the power output apparatus 120B of the modified embodiment, an effect similar to that of the power output apparatus 120 of the second embodiment can be achieved by setting the optimum carrier frequency F where the loss of the chopper circuit part is minimized from the current flowing to the neutral point as in the power output apparatus 120 of the second embodiment.

In the power output apparatus 120 of the second embodiment, the battery 132 is attached so as to connect to the negative bus line 128 of the inverter circuit 124 and to the neutral point of the motor 122. However, the battery 132 may be attached so as to connect to the positive bus line 126 of the inverter circuit 124 and to the neutral point of the motor 122. Furthermore, in the power output apparatus 120B of the modified embodiment, the battery 132 is attached so as to connect to the negative bus line 128 of the inverter circuit 124 and to the neutral point of the motor 122, and the capacitor 130B is attached so as to connect to the positive bus line 126 of the inverter circuit 124 and to the neutral point of the motor 122. However, the capacitor may be attached so as to connect to the negative bus line 128 of the inverter circuit 124 and to the neutral point of the motor 122, and the battery may be attached so as to connect to the positive bus line 126 of the inverter circuit 124 and to the neutral point of the motor 122.

In the power output apparatus 120 of the second embodiment and the power output apparatus 120B of the modified embodiment, the target neutral point current Io* is calculated on the basis of the power required by the motor 122 (battery output required BP*) and the voltage Vb of the battery 132, and the optimum carrier frequency F is set from the calculated target neutral point current Io*. However, the current flowing through the neutral point of the motor 122 may be detected by the DC current sensor 164, and the optimum carrier frequency F may be set from the detected current.

In the power output apparatus 120 of the second embodiment and the power output apparatus 120B of the modified embodiment, the optimum carrier frequency F is set where the loss of the chopper circuit part (phase coils and transistors T1 to T6) is minimized. However, if a slight increase in loss is allowable, the carrier frequency may be set within an allowable range centering on the optimum carrier frequency F.

In the power output apparatuses 20, 120 of the first and second embodiments and their modified embodiments, the synchronous generator-motor driven by the three-phase alternating current is used as the motors 22, 122. However, any type of motor driven by polyphase alternating current may be used.

Although embodiments are used in the description above regarding the embodiments of the present invention, the invention is not limited in any way to the embodiments, and may be embodied in various modes within the scope of the present invention.

What is claimed is:

1. A drive apparatus comprising:
   a DC/DC converter having an energy storing device capable of storing DC current as energy, and being capable, by using the energy storing device, of performing DC/DC conversion on an input DC voltage by the switching of a switching element and outputting to a load;
   a power source capable of outputting DC power to the DC/DC converter;
   a controller for setting a switching frequency for the switching element on the basis of loss characteristics of the DC/DC converter corresponding to current flowing through the energy storing device, and for controlling the switching of the switching element at the set frequency.

2. A drive apparatus according to claim 1, wherein loss characteristics of the DC/DC converter are obtained using loss characteristics of the energy storing device and loss characteristics of the switching element.

3. A drive apparatus according to claim 1, comprising a current calculator for calculating the current flowing through the energy storing device on the basis of power required by the load and voltage of the power source.

4. A drive apparatus according to claim 1, comprising a current detector for directly detecting the current flowing through the energy storing device.

5. A control method for a drive apparatus comprising a DC/DC converter having an energy storing device capable of storing DC current as energy, and being capable, by using the energy storing device, of performing DC/DC conversion on an input DC voltage by the switching of a switching element and outputting to a load, and a power source capable of supplying DC power to the DC/DC converter, comprising the steps of:
   setting the switching frequency for the switching element on the basis of loss characteristics of the DC/DC converter corresponding to current flowing through the energy storing device; and
   controlling the switching of the switching element at the set frequency.

6. In a medium for storing a program controlling the operation of a drive apparatus comprising a DC/DC converter having an energy storing device capable of storing DC current as energy, and being capable, by using the energy storing device, of performing DC/DC conversion on an input DC voltage by the switching of a switching element and outputting to a load, and a power source capable of supplying DC power to the DC/DC converter;
   a computer readable storage medium in which is stored a program for executing by a computer:
   a frequency set processing step for setting the switching frequency for the switching element on the basis of loss characteristics of the DC/DC converter corresponding to current flowing through the energy storing device; and
   a control processing step for controlling the switching of the switching element at the set frequency.

7. A power output apparatus comprising:
   a motor rotationally driven by a polyphase alternating current;
   an inverter circuit capable of supplying polyphase alternating current power to the motor by the switching of a switching element;
   a chargeable first power source that is connected to a positive bus line and a negative bus line of the inverter circuit;
   a second power source that is connected to either the positive bus line or the negative bus line of the inverter and to a neutral point of the motor;
   a controller for setting the switching frequency for the switching element on the basis of loss characteristics of a power converter capable of converting power from the second power source, and supplying to the first power source, including the switching element of the inverter and a coil of the motor, corresponding to current flowing through the neutral point of the motor, and for controlling the switching of the switching element at the set frequency.

8. A power output apparatus according to claim 7, wherein loss characteristics of the power converter are obtained from loss characteristics of phase coils of the motor and loss characteristics of the switching element.

9. A power output apparatus according to claim 7, comprising a current calculator for calculating the current flowing through the neutral point of the motor on the basis of the output required by the power output apparatus and the voltage of the second power source.

10. A power output apparatus according to claim 7, comprising a current detector for directly detecting the current flowing through the neutral point of the motor.

11. A power output apparatus comprising:
    a motor rotationally driven by a polyphase alternating current;
    an inverter circuit capable of supplying polyphase alternating current power to the motor by the switching of a switching element;
    a chargeable first power source that is connected to either one of a positive bus line or a negative bus line of the inverter circuit and to a neutral point of the motor;
    a second power source that is connected to one of the positive bus line and the negative bus line, which is not connected with the first power source, of the inverter and to the neutral point of the motor;
    a controller for setting the switching frequency for the switching element on the basis of loss characteristics of a power converter capable of converting power from the second power source, and supplying to the first power source, including the switching element of the inverter and a coil of the motor, corresponding to current flowing through the neutral point of the motor, and for controlling the switching of the switching element at the set frequency.

12. A power output apparatus according to claim 11, wherein loss characteristics of the power converter are obtained from loss characteristics of phase coils of the motor and loss characteristics of the switching element.

13. A power output apparatus according to claim 11, comprising a current calculator for calculating the current flowing through the neutral point of the motor on the basis of the output required by the power output apparatus and the voltage of the second power source.

14. A power output apparatus according to claim 11, comprising a current detector for directly detecting the current flowing through the neutral point of the motor.

* * * * *